US010940765B2

(12) United States Patent
Takeshita et al.

(10) Patent No.: US 10,940,765 B2
(45) Date of Patent: Mar. 9, 2021

(54) BICYCLE DISPLAY

(71) Applicant: Shimano Inc., Osaka (JP)

(72) Inventors: Hiroaki Takeshita, Osaka (JP); Satoshi Shahana, Osaka (JP); Natsuki Noma, Osaka (JP); Ayumi Kato, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/680,435

(22) Filed: Nov. 11, 2019

(65) Prior Publication Data
US 2020/0079458 A1 Mar. 12, 2020

Related U.S. Application Data

(63) Continuation of application No. 15/621,876, filed on Jun. 13, 2017, now Pat. No. 10,507,881.

(30) Foreign Application Priority Data

Jun. 14, 2016 (JP) .............................. JP2016-118149

(51) Int. Cl.
B60L 50/20 (2019.01)
G09G 3/34 (2006.01)
(Continued)

(52) U.S. Cl.
CPC ............... B60L 50/20 (2019.02); B60L 15/30 (2013.01); B60L 50/64 (2019.02); B62J 99/00 (2013.01);
(Continued)

(58) Field of Classification Search
CPC .................................................... B60L 50/20
See application file for complete search history.

(56) References Cited

U.S. PATENT DOCUMENTS 5,971,090 A * 10/1999 Tanaka ..................... B62M 6/45
180/206.2
6,084,506 A * 7/2000 Irie .......................... B62J 99/00
340/432
(Continued)

FOREIGN PATENT DOCUMENTS

CN 1410317 A 4/2003
CN 202911559 U 5/2013
(Continued)

OTHER PUBLICATIONS ebiketestsieger.com; Bosch Nyon E. Bike Computers, Stand vom May 25, 2020;http://www.ebiketestsieger.com/e-bike-news/203-geheime-funktionen-beim-bosch-nyon-e-bike-computer.html.
(Continued)

Primary Examiner — Alex C Dunn
(74) Attorney, Agent, or Firm — Global IP Counselors, LLP

(57) ABSTRACT

A bicycle display is provided that allows the user to recognize the selected operation mode. The bicycle display includes a display screen configured to display an output state of a motor that assists in propelling of a bicycle. The display screen is configured to display an output state of the motor in a first color in a state where the motor is controlled in a first operating mode, and configured to display an output state of the motor in a second color which is different from the first color in a state where the motor is controlled in a second operating mode which is different from the first operating mode.

18 Claims, 4 Drawing Sheets

(51) Int. Cl.
*G09G 3/04* (2006.01)
*B62M 6/45* (2010.01)
*B60L 50/64* (2019.01)
*B60L 15/30* (2006.01)
*B62J 99/00* (2020.01)
*B62M 6/50* (2010.01)
*G09G 5/00* (2006.01)
*B62J 45/20* (2020.01)
*B62J 45/40* (2020.01)
*B62J 50/20* (2020.01)
*B62J 50/21* (2020.01)
*G06T 11/20* (2006.01)

(52) U.S. Cl.
CPC .............. *B62M 6/45* (2013.01); *B62M 6/50* (2013.01); *G09G 3/04* (2013.01); *G09G 3/3413* (2013.01); *G09G 5/006* (2013.01); *B60L 2200/12* (2013.01); *B60L 2240/12* (2013.01); *B60L 2250/16* (2013.01); *B62J 45/20* (2020.02); *B62J 45/40* (2020.02); *B62J 50/20* (2020.02); *B62J 50/225* (2020.02); *G06T 11/206* (2013.01); *G09G 2340/045* (2013.01); *G09G 2354/00* (2013.01); *G09G 2380/10* (2013.01); *Y02T 10/70* (2013.01); *Y02T 10/72* (2013.01)

(56) References Cited

U.S. PATENT DOCUMENTS

| | | | |
|---|---|---|---|
| 9,805,484 B2 * | 10/2017 | Endo | G06F 15/0225 |
| 2010/0010709 A1 * | 1/2010 | Song | B62M 25/08 |
| | | | 701/37 |
| 2011/0295454 A1 * | 12/2011 | Meyers | B60L 15/2036 |
| | | | 701/22 |
| 2012/0221202 A1 * | 8/2012 | Ikemoto | B62K 25/28 |
| | | | 701/37 |
| 2012/0221203 A1 * | 8/2012 | Ichida | B62K 25/04 |
| | | | 701/37 |
| 2012/0221204 A1 * | 8/2012 | Ichida | B62K 25/04 |
| | | | 701/37 |
| 2012/0221205 A1 * | 8/2012 | Ichida | B62K 23/02 |
| | | | 701/37 |
| 2012/0280804 A1 * | 11/2012 | Matsumoto | B60L 53/14 |
| | | | 340/425.5 |
| 2014/0077941 A1 | 3/2014 | Yamamura et al. | |
| 2015/0251600 A1 * | 9/2015 | Mochizuki | G06T 11/203 |
| | | | 345/7 |
| 2016/0318583 A1 * | 11/2016 | Watarai | B62M 6/55 |
| 2017/0144673 A1 * | 5/2017 | Matsumoto | B60L 58/13 |

FOREIGN PATENT DOCUMENTS

| | | |
|---|---|---|
| CN | 202986844 U | 6/2013 |
| CN | 203888981 U | 10/2014 |
| CN | 104176061 A | 12/2014 |
| JP | 06-074070 A | 3/1994 |
| JP | 10-119874 A | 5/1998 |
| JP | 2002-325227 A | 9/2003 |
| JP | 2003-252271 A | 9/2003 |
| JP | 4180305 B2 | 11/2008 |
| JP | 4272217 B2 | 6/2009 |
| JP | 2012-180089 A | 9/2012 |
| JP | 2013-43528 A | 3/2013 |
| JP | 2015-071404 A | 4/2015 |
| JP | 2015-174539 A | 10/2015 |
| WO | 2012/153395 A1 | 11/2012 |

OTHER PUBLICATIONS

Robert Bosch GmbH: Nyon Deckblatt Betriebsanleitung Online-Version. Reutlingen, 2014; https://www.boschebike.com/fileadmin/EBC/Service/Downloads/Bedienungsanleitungen/Bosch-eBike-Nyon-Bedienungsanleitung_MY15DE.pdf.

* cited by examiner

BICYCLE DISPLAY

CROSS-REFERENCE TO RELATED APPLICATIONS

This application is a continuation application of U.S. patent application Ser. No. 15/621,876, which was filed on Jun. 13, 2017. This application claims priority to Japanese Patent Application No. 2016-118149, filed on Jun. 14, 2016. The entire disclosures of Japanese Patent Application No. 2016-118149 and U.S. patent application Ser. No. 15/621,876 are hereby incorporated herein by reference.

BACKGROUND

Field of the Invention

The present invention relates to a display for a bicycle.

Background Information

A bicycle display coupled to a bicycle and showing various kinds of information is known in the prior art. Japanese Patent No. 4272217 (Patent document 1) describes a bicycle display that includes a step display screen, which changes the illuminated area of segments to show the segments in a stepped manner in accordance with the number of rotations of the crank.

SUMMARY

Although the bicycle display of patent document 1 is configured to display an operation state of a bicycle component, no consideration is made for the user to recognize an operation mode of the bicycle component.

One object of the present invention is to provide a bicycle display that allows the user to easily recognize the selected operation mode.

In accordance with a first aspect of the present invention, a bicycle display includes a display screen configured to display an output state of a motor that assists in propelling of a bicycle. The display screen is configured to display an output state of the motor in a first color in a state where the motor is controlled in a first operating mode, and configured to display an output state of the motor in a second color which is different from the first color in a state where the motor is controlled in a second operating mode which is different from the first operating mode.

With the bicycle display according to the first aspect, the output state of a motor is shown on the display screen in different colors in accordance with the operation mode of the motor. This allows the user to easily recognize the selected operation mode.

In accordance with a second aspect of the present invention, the bicycle display according to the first aspect is configured so that the display screen is configured to display an output state of the motor in a third color in a state where the motor is controlled in a third operation mode which is different from the first and second operation modes, and the third color being different from the first and second colors. With the bicycle display according to the second aspect, the output state of a motor is shown on the display screen in different colors in accordance with the operation mode of the motor. This allows the user to easily recognize the selected operation mode.

In accordance with a third aspect of the present invention, the bicycle display according to the second aspect is configured so that the display screen is configured to display an output state of the motor in a fourth color in a state where the motor is controlled in a fourth operation mode which is different from the first second and third operation modes, and the fourth color being different from the first, second and third colors. With the bicycle display according to the third aspect, the output state of a motor is shown on the display screen in different colors in accordance with the operation mode of the motor. This allows the user to easily recognize the selected operation mode.

In accordance with a fourth aspect of the present invention, the bicycle display according to the third aspect is configured so that a display driver is connected to the display screen to switch a display state of a switching region of the display screen between a first display state, which shows the switching region in the first color when the first operation mode is selected, and a second display state, which shows the switching region in the second color is a state where the second operation mode is selected. With the bicycle display according to the fourth aspect, the switching region of the display screen shows the output state of the motor in different colors in accordance with the operation mode. This allows the user to easily recognize the output state of the motor.

In accordance with a fifth aspect of the present invention, the bicycle display according to the fourth aspect is configured so that the display driver is configured to switch the switching region to a third display state when the third operation mode is selected to show the switching region in the third color. With the bicycle display according to the fifth aspect, the bicycle display allows the user to easily recognize the operation mode and the output state of the motor.

In accordance with a sixth aspect of the present invention, the bicycle display according to the fifth aspect is configured so that the display driver is configured to switch the switching region to a fourth display state when the fourth operation mode is selected to show the switching region in the fourth color. With the bicycle display according to the sixth aspect, the bicycle display allows the user to easily recognize the operation mode and the output state of the motor.

In accordance with a seventh aspect of the present invention, the bicycle display according to the first aspect is configured so that the first operation mode and the second operation mode differ from each other in at least one of a ratio of driving power of the motor to human power and an upper limit value of output torque of the motor. With the bicycle display according to the seventh aspect, the bicycle display allows the user to easily recognize a change in at least one of the ratio of driving power of the motor to human power and the upper limit value of output torque of the motor.

In accordance with an eighth aspect of the present invention, the bicycle display according to the fourth aspect is configured so that the display driver is configured to display an output state of the motor in the first operation mode or the second operation mode with a graph in an output display region of the display screen. With the bicycle display according to the eighth aspect, the bicycle display allows the user to easily recognize the output state of the motor.

In accordance with a ninth aspect of the present invention, the bicycle display according to the eighth aspect is configured so that the display driver is configured to display the output display region adjacent to the switching region. With the bicycle display according to the ninth aspect, the bicycle display allows the user to easily recognize the operation mode and the output state of the motor.

In accordance with a tenth aspect of the present invention, the bicycle display according to the eighth aspect is configured so that the display driver is configured to display the graph in the first color in the output display region when the switching region is in the first display state, and display the graph in the second color in the output display region when the switching region is in the second display state. With the bicycle display according to the tenth aspect, the bicycle display allows the user to easily recognize the operation mode of the motor.

In accordance with an eleventh aspect of the present invention, the bicycle display according to the eighth aspect is configured so that the display driver is configured to display the output display region as greater in area than the switching region. With the bicycle display according to the eleventh aspect, the bicycle display allows the user to further easily recognize the output state of the motor.

In accordance with a twelfth aspect of the present invention, the bicycle display according to the eighth aspect is configured so that the display driver is configured to display the graph or a portion of the graph that is colored in the output display region in area that increases in size as an output of the motor increases. With the bicycle display according to the twelfth aspect, the area of the graph of the output display region that is shown or the portion of the graph that is colored is correlated with the amount of the output torque of the motor in the operation mode. This allows the user to easily recognize the amount of the output of the motor.

In accordance with a thirteenth aspect of the present invention, the bicycle display according to the eighth aspect is configured so that the display driver is configured to display the graph of the output display region as including a bar graph. With the bicycle display according to the thirteenth aspect, the bicycle display allows the user to recognize the amount of the output of the motor in the operation mode by changing the area of the bar graph that is shown.

In accordance with a fourteenth aspect of the present invention, the bicycle display according to the fourth aspect is configured so that the display driver is configured to display a charge state display region showing a battery level. With the bicycle display according to the fourteenth aspect, the charge state display region shows the state of charge of the battery. This allows the user to recognize the battery level.

In accordance with a fifteenth aspect of the present invention, the bicycle display according to the fourteenth aspect is configured so that the display driver is configured to display the state of charge of the battery in the charge state display region in a color that differs from the first color and the second color. With the bicycle display according to the fifteenth aspect, the charge state display region and the switching region are shown in different colors. This allows the user to separately recognize the operation mode and the state of charge of the battery.

In accordance with a sixteenth aspect of the present invention, the bicycle display according to the fifteenth aspect is configured so that the display driver is configured to switch at least one of the switching region and the output display region to a warning display state to be shown in a color differing from the first color and the second color when the state of charge of the battery is less than a predetermined value. With the bicycle display according to the sixteenth aspect, when the state of charge of the battery is low, at least one of the switching region and the output display region is switched to the warning display state. This allows the user to easily recognize that the state of charge of the battery is low.

In accordance with a seventeenth aspect of the present invention, in the bicycle display according the sixteenth aspect is configured so that the display driver is configured to display at least one of the switching region and the output display region in the warning display state intermittently in the color. With the bicycle display according to the seventeenth aspect, the bicycle display allows the user to recognize that the state of charge of the battery is low more easily than in a case that the color is simply shown in the warning display state.

In accordance with an eighteenth aspect of the present invention, the bicycle display according to the sixteenth aspect is configured so that the display driver is configured to display the switching region and the output display region in the warning display state in the same color. With the bicycle display according to the eighteenth aspect, the bicycle display allows the user to recognize that the state of charge of the battery is low more easily than in a case that the switching region and the output display region are shown in different colors in the warning display state.

In accordance with a nineteenth aspect of the present invention, the bicycle display according to any one of the first to eighteenth aspects is configured so that the display driver is configured to display a vehicle speed display region on the display screen to show a vehicle speed of a bicycle. With the bicycle display according to the nineteenth aspect, the bicycle display allows the user to recognize the vehicle speed of the bicycle.

In accordance with a twentieth aspect of the present invention, the bicycle display according to the nineteenth aspect is configured so that the display driver is configured to display the vehicle speed of the bicycle in the vehicle speed display region in a color that differs from the first color and the second color. With the bicycle display according to the twentieth aspect, the vehicle speed display region and the switching region are shown in different colors. This allows the user to separately recognize the operation mode and the vehicle speed of the bicycle.

The bicycle display allows the user to easily recognize the selected operation mode.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
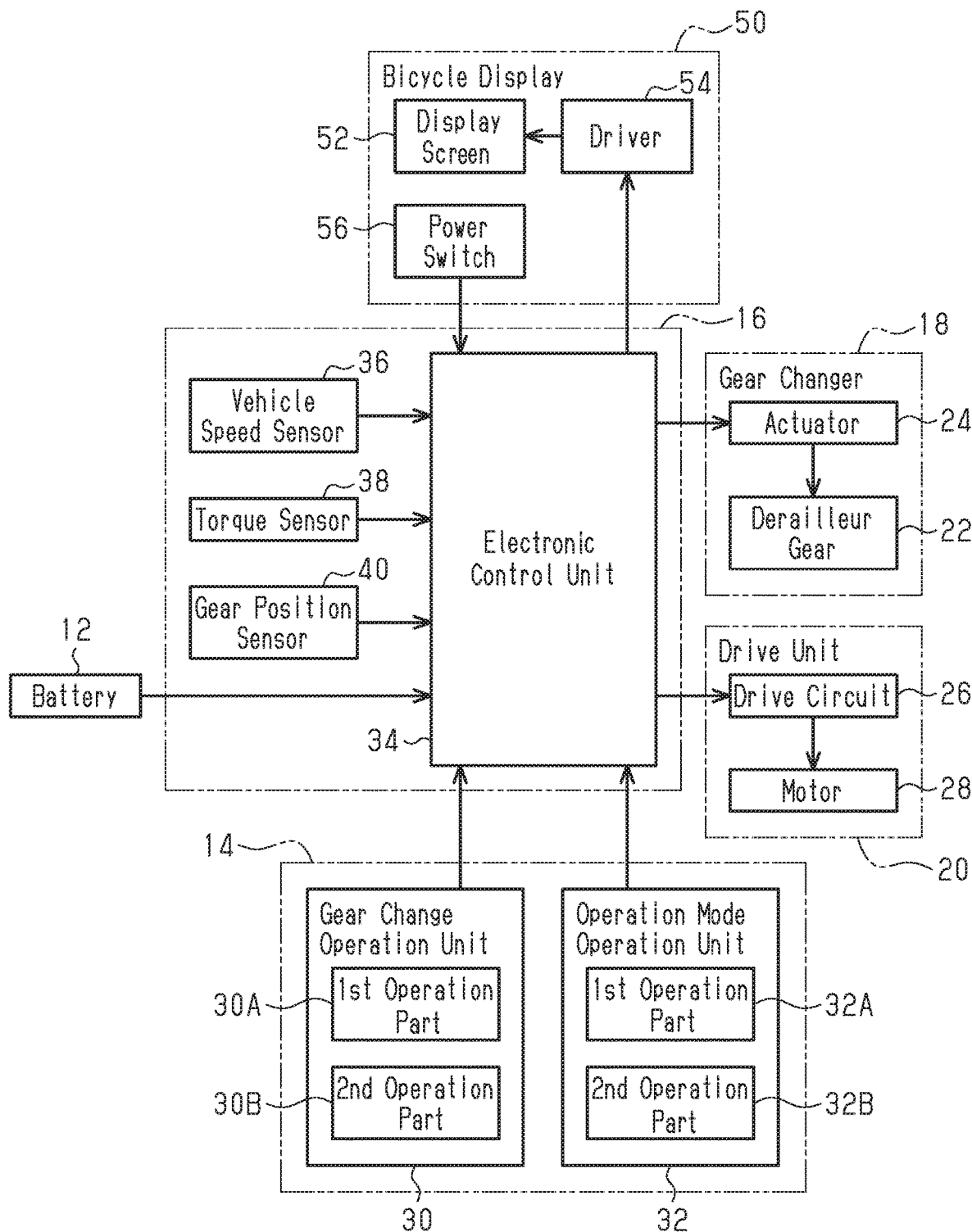
FIG. 1 is a block diagram showing an electric configuration of a bicycle equipped with a bicycle display in accordance with one embodiment.

FIG. 1 is a block diagram showing an electric configuration of a bicycle on which a bicycle display 50 is mounted. The bicycle includes a battery 12, an operation unit 14, a controller 16, a transmission 18, an assist drive unit 20 and a bicycle display 50. In the description hereafter, the assist drive unit 20 is referred to as the drive unit 20. The transmission 18 and the drive unit 20 are each one example of a bicycle component. The transmission 18 includes a derailleur 22 and an actuator 24. The transmission 18 can include an internal-hub transmission instead of the derailleur 22.

The derailleur 22 includes at least one of a front derailleur and a rear derailleur. The actuator 24 includes an electric motor. The actuator 24 can include a reduction gear that reduces the speed of rotation of the electric motor.

The drive unit 20 includes a drive circuit 26 and a motor 28. The drive circuit 26 controls electric power supplied from the battery 12 to the motor 28. The motor 28 assists propelling of the bicycle. The motor 28 assists human power that is input to the bicycle. The motor 28 includes an electric motor. The motor 28 is connected to a power transmission path that extends between a crank axle and a rear sprocket of the bicycle. Preferably, the motor 28 is connected to a power transmission path that extends between the crank axle and a front sprocket. The drive unit 20 can include a reduction gear that reduces the speed of rotation of the motor 28. The drive unit 20 can be included in a front hub or a rear hub. In such a case, the motor 28 is connected to a hub shell of the front hub or the rear hub.

The drive unit 20 is operable in a plurality of operation modes. The operation modes include a ride mode and a walk mode. The ride mode is performed when the user is riding the bicycle (hereafter, referred to as "ride state"). The walk mode is performed when the user is walking the bicycle (hereafter, referred to as "walk state").

The ride mode includes a first operation mode, a second operation mode, a third operation mode and a fourth operation mode. The first operation mode is expressed, for example, as a BOOST mode. The second operation mode is expressed, for example, as a TRAIL mode. The third operation mode is expressed, for example, as an ECO mode. The fourth operation mode is expressed, for example, as an OFF mode.

The first operation mode, the second operation mode and the third operation mode have different assist ratios and different upper limit values of output torque of the motor 28. The assist ratio is a ratio of driving power of the motor 28 to human power. In a case that a reduction gear is connected to the motor 28, the assist ratio is a ratio of driving power that is output from the reduction gear of the motor 28 relative to human power. In this case, it is preferred that the output torque of the motor 28 be the output torque of the reduction gear of the motor 28.

The assist ratio of the first operation mode is greater than that of the second operation mode. The assist ratio of the second operation mode is greater than that of the third operation mode. The upper limit value of the motor 28 in first operation mode is greater than that in the second operation mode. The upper limit value of the motor 28 in the second operation mode is greater than that in the third operation mode.

In the fourth operation mode, the motor 28 is not driven. The walk mode assists propelling of the bicycle by applying assisting power to the bicycle that is walked by the user. In the walk mode, the motor 28 is driven so that the vehicle speed of the bicycle will not exceed a predetermined value. In order for the output torque of the motor 28 in each operation mode not to exceed an upper limit value that is set for the operation mode, the drive circuit 26 limits the output torque of the motor 28 to the set upper limit value. The relationship of the assist ratios in the first operation mode to the third operation mode are satisfied until the output torque of the motor 28 in each operation mode reaches the corresponding upper limit value.

The operation unit 14 is coupled to a handlebar (not shown) of the bicycle. The controller 16 includes an electronic control unit 34 that is connected to the operation unit 14 to be able to perform wired or wireless communication with the operation unit 14. The operation unit 14 includes a gear change operation unit 30 and an operation mode operation unit 32.

The user operates the gear change operation unit 30 to change the gear ratio. The gear change operation unit 30 includes a first operation part 30A and a second operation part 30B. The first operation part 30A and the second operation part 30B include a switch or a lever. In a case that the user operates the first operation part 30A, the gear change operation unit 30 transmits a gear change signal that increases the gear ratio of the bicycle to the electronic control unit 34. In a case that the user operates the second operation part 30B, the gear change operation unit 30 transmits a gear change signal that decreases the gear ratio of the bicycle to the electronic control unit 34.

The user operates the operation mode operation unit 32 to change the operation mode of the drive unit 20. The operation mode operation unit 32 includes a first operation part 32A and a second operation part 32B. The first operation part 32A and the second operation part 32B include a switch or a lever. In a case that the user operates one of the first operation part 32A and the second operation part 32B, the operation mode of the drive unit 20 is switched among the first operation mode, the second operation mode, the third operation mode, the fourth operation mode and the walk mode. In a case that the user operates the first operation part 32A in the walk mode, the operation mode of the drive unit 20 is sequentially switched to the fourth operation mode, the third operation mode, the second operation mode and the first operation mode. In a case that the user operates the second operation part 32B in the first operation mode, the operation mode of the drive unit 20 is sequentially switched to the second operation mode, the third operation mode, the fourth operation mode and the walk mode. The operation mode operation unit 32 transmits a signal corresponding to the operation mode that is selected by the user to the electronic control unit 34. The electronic control unit 34 switches the operation mode of the drive unit 20 based on the operation performed on the operation unit 14.

The battery 12 includes one or a plurality of battery cells. The battery 12 is electrically connected to the actuator 24 of the transmission 18 and the motor 28 of the drive unit 20 to supply electric power to the actuator 24 and the motor 28. The battery 12 also supplies electric power to the controller 16, the bicycle display 50, and the operation unit 14.

The controller 16 includes the electronic control unit 34, a vehicle speed sensor 36, a torque sensor 38 and a gear position sensor 40.

The electronic control unit 34 is electrically connected to the drive unit 20, the battery 12, the operation unit 14, the vehicle speed sensor 36, the torque sensor 38, the gear position sensor 40 and the bicycle display 50. The electronic control unit 34 drives the actuator 24 to operate the derailleur 22. The electronic control unit 34 controls the drive circuit 26 to drive the motor 28. The electronic control unit 34 can include general circuits such as an input interface circuit and an output interface circuit. Preferably, the electronic control unit 34 includes a microcomputer that has an arithmetic operation unit including one or more processors. Preferably, the electronic control unit 34 further includes a memory device that stores programs. The memory device includes memories such as a ROM, a RAM, and a hard disk. The electronic control unit 34 can be located in one of the drive unit 20, the bicycle display 50, the operation unit 14, and the transmission 18. Alternatively, the electronic control unit 34 can be separately located. The bicycle display 50, the drive unit 20, and the transmission 18 can each include a microcomputer forming the electronic control unit 34. In this case, one of the microcomputers serves as a master while the remaining microcomputers serve as slaves so that each microcomputer performs assigned control.

The vehicle speed sensor 36 is configured to perform wired or wireless communication with the electronic control unit 34. The vehicle speed sensor 36 is coupled to, for example, a front fork (not shown) of the bicycle. The vehicle speed sensor 36 outputs a value corresponding to a change in the position relative to a magnet (not shown) attached to a spoke (not shown) of a front wheel and transmits the value to the electronic control unit 34. Preferably, the vehicle speed sensor 36 includes a magnetic reed forming a reed switch or a Hall element. The vehicle speed sensor 36 can be coupled to a chainstay of the bicycle. In this case, a magnet is attached to a spoke of a rear wheel. The vehicle speed sensor 36 can include a GPS.

The torque sensor 38 is configured to perform wired or wireless communication with the electronic control unit 34. The torque sensor 38 outputs a signal corresponding to human power applied to crank arms or pedals. The torque sensor 38 is, for example, a strain sensor, a magnetostrictive sensor, an optical sensor or a pressure sensor. The torque sensor 38 is arranged, for example, in a power transmission path that extends from the pedals to the rear wheel.

The gear position sensor 40 is configured to perform wired or wireless communication with the electronic control unit 34. The gear position sensor 40 detects the gear of the transmission 18, for example, by detecting rotation of the actuator 24. In a case that the derailleur 22 is used, the gear corresponds to the position of a chain that runs on a plurality of front sprockets or a plurality of rear sprockets. The gear position sensor 40 transmits a signal corresponding to the detected gear to the electronic control unit 34.

The bicycle display 50 includes a display screen 52 that is configured to display information corresponding to the first operation mode and the second operation mode of the drive unit 20, which is selectable at least the first operation mode and the second operation mode in accordance with an operation performed on the operation unit 14. Preferably, the bicycle display 50 includes a display driver 54, which drives the display screen 52 and a power switch 56. Hereinafter, the display driver 54 will be referred to as the driver 54.

The driver 54 is configured to perform wired or wireless communication with the electronic control unit 34. The driver 54 is electrically connected to the electronic control unit 34 and the display screen 52. The driver 54 is connected to the electronic control unit 34 to be able to perform wired or wireless communication with the electronic control unit 34. The driver 54 is configured to switch the display state of the display screen 52 based on the information received by the electronic control unit 34 from the battery 12, the operation unit 14, the vehicle speed sensor 36, the torque sensor 38 and the gear position sensor 40. The driver 54 can be a semiconductor integrated circuit, or a plurality of components which provide an interface function between the electronic control unit 34 and the display screen 52, e.g. LCD, LED, OLED, e-paper display.

The power switch 56 switches activation and deactivation of the bicycle display 50 and the drive unit 20. In a case that the user performs an activation operation on the power switch 56, the bicycle display 50 and the drive unit 20 are activated. In a case that the user performs a deactivation operation on the power switch 56, the bicycle display 50 and the drive unit 20 are deactivated. The power switch 56 can be located, for example, on the operation unit 14. The power switch 56 is also capable of switching activation and deactivation of the transmission 18 and the controller 16.

Figure 2:
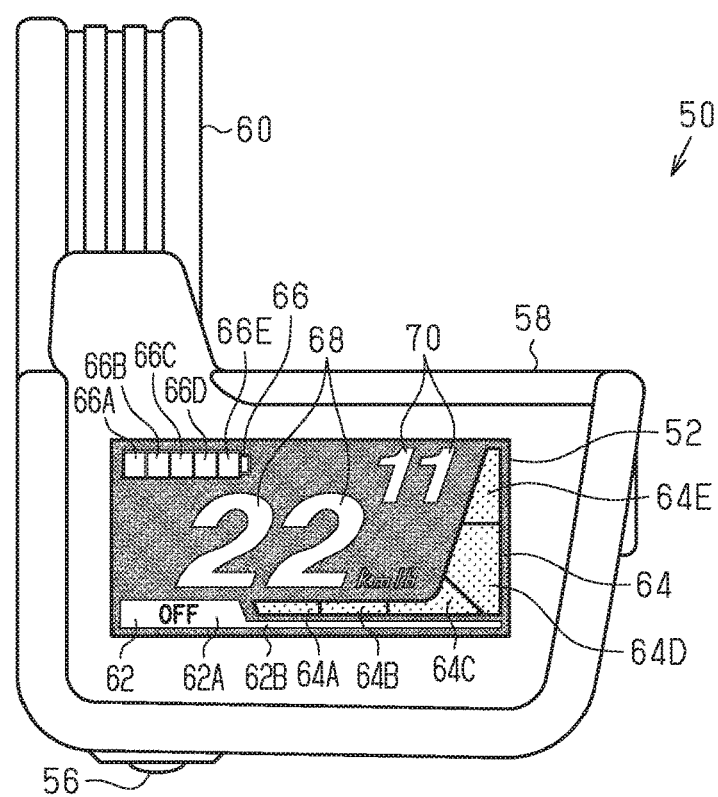
FIG. 2 is a front view showing the bicycle display of the embodiment illustrated in FIG. 1.

As shown in FIG. 2, preferably, the bicycle display 50 includes a main body 58, on which the display screen 52 is located, and a coupling portion 60, which can be coupled to the bicycle. The display screen 52 is, for example, a transmissive liquid crystal display. Alternatively, the display screen 52 can be a reflective liquid crystal display or an organic EL display. The display screen 52 includes a switching region 62 that is switched between a first display state and a second display state by the driver 54. The first display state is shown in a first color in a state where the first operation mode is selected. The second display state is shown in a second color in a state where the second operation mode is selected. Preferably, the switching region 62 is further switched to a third display state, a fourth display state, and a fifth display state in addition to the first display state and the second display state. The switching region 62 is switched by the driver 54 to the third display state that is shown in a third color in a state where the third operation mode is selected. The switching region 62 is switched by the driver 54 to the fourth display state that is shown in a fourth color in a state where the fourth operation mode is selected. The switching region 62 is switched by the driver 54 to the fifth display state that is shown in a fourth color or intermittently shows a character or a graphic shown in the switching region 62 in a state where the walk mode is selected and the motor 28 is operated. The display state of the switching region 62 is switched by the driver 54 (refer to FIG. 1). In the embodiment, different colors mean that at least one of brightness, colorfulness, and hue is different. Preferably, hue is different. The first color, the second color, the third color, and the fourth color differ from one another in at least one of brightness, colorfulness, and hue, and preferably in hue. The first color is, for example, orange. The second color is, for example, yellow. The third color is, for example, green. The fourth color is, for example, white. The display region of the display screen 52 can have any shape. However, it is preferred that the display region be rectangular. In the present embodiment, the display region of the display screen 52 is rectangular and has different lengths in a first direction and a second direction that are orthogonal to each other. The length in the first direction is less than the length in the second direction. The switching region 62 is arranged at a first end of the display region of the display screen 52 in the first direction.

In the first display state, the switching region 62 shows a character or a graphic corresponding to the first operation mode. In the second display state, the switching region 62 shows a character or a graphic corresponding to the second operation mode. In the third display state, the switching region 62 shows a character or a graphic corresponding to the third operation mode. In the fourth display state, the switching region 62 shows a character or a graphic corresponding to the fourth operation mode. In the fifth display state, the switching region 62 shows a character or a graphic corresponding to the fifth operation mode. In the present embodiment, in each operation state, the switching region 62 shows a character corresponding to the operation mode.

The switching region 62 extends from a first end to a second end of the display region of the display screen 52 in the second direction. The switching region 62 includes a first portion 62A and a second portion 62B. In each operation state, the first portion 62A shows characters corresponding to the operation mode. The first portion 62A is arranged at the first end in the second direction. The second portion 62B is connected to the first portion 62A and extended in the display region of the display screen 52 in the second direction.

The display screen 52 includes an output display region 64 that is configured to display an output state of the motor 28 in the first operation mode or the second operation mode with a graph. The output display region 64 is configured to display the output state of the motor 28 with the graph in the third operation mode and the walk mode in addition to the first operation mode or the second operation mode. The output state of the motor 28 is one example of an operation state of a bicycle component.

The output display region 64 is located adjacent to the switching region 62. The output display region 64 shows the graph in the first color when the switching region 62 is in the first display state and in the second color when the switching region 62 is in the second display state. The output display region 64 shows the graph in the third color when the switching region 62 is in the third display state, and does not display the graph when the switching region 62 is in the fourth display state. The output display region 64 intermittently shows the graph in the fourth color when the switching region 62 is in the fifth display state. The area of the output display region 64 in the display screen 52 is greater than that of the switching region 62. The output display region 64 shows the graphic corresponding to one of the operation mode and the operation state of the bicycle component in the color corresponding to the other one of the operation mode and the operation state of the bicycle component. The output display region 64 shows the graphic corresponding to one of the operation mode and the operation state of the drive unit 20 in the color corresponding to the other one of the operation mode and the operation state of the drive unit 20. In the present embodiment, the output display region 64 shows the graphic corresponding to the output state of the motor 28, which is the operation state of the drive unit 20, in the color corresponding to the operation mode of the drive unit 20.

The graph of the output display region 64 is a bar graph. The output display region 64 is divided into a first section 64A, a second section 64B, a third section 64C, a fourth section 64D, and a fifth section 64E. The driver 54 (refer to FIG. 1) changes the display of the first section 64A to the fifth section 64E in accordance with the amount of the output torque of the motor 28 of the drive unit 20. In the present embodiment, the output display region 64 is L-shaped. The first section 64A, the second section 64B, and the third section 64C are arranged next to one another in the second direction. The fourth section 64D and the fifth section 64E are arranged next to each other in the first direction. The output display region 64 shows the proportion of the output torque of the motor 28 in the current operation mode of the drive unit 20 to the maximum output torque that is set for the current operation mode.

In each operation mode of the drive unit 20, when the output torque of the motor 28 is included in a range of 0% or greater and less than 20% of the maximum output torque set for the operation mode, the output display region 64 is shown in the color corresponding to the operation mode only in the first section 64A.

In each operation mode of the drive unit 20, when the output torque of the motor 28 is included in a range of 20% or greater and less than 40% of the maximum output torque set for the operation mode, the output display region 64 is shown in the color corresponding to the operation mode only in the first section 64A and the second section 64B.

In each operation mode of the drive unit 20, when the output torque of the motor 28 is included in a range of 40% or greater and less than 60% of the maximum output torque set for the operation mode, the output display region 64 is shown in the color corresponding to the operation mode only in the first section 64A to the third section 64C.

In each operation mode of the drive unit 20, when the output torque of the motor 28 is included in a range of 60% or greater and less than 80% of the maximum output torque set for the operation mode, the output display region 64 is shown in the color corresponding to the operation mode only in the first section 64A to the fourth section 64D.

In each operation mode of the drive unit 20, when the output torque of the motor 28 is included in a range of 80% or greater and 100% or less of the maximum output torque set for the operation mode, the output display region 64 is shown in the color corresponding to the operation mode in all of the first section 64A to the fifth section 64E.

As described above, as the output of the motor 28 increases, the output display region 64 increases the area of the graph that is shown or portions of the graph that is colored.

At least one of the switching region 62 and the output display region 64 is switched by the driver 54 to a warning display state that is shown in a color that differs from the first color and the second color when the state of charge of the battery 12 is less than a predetermined value. In the present embodiment, when the state of charge of the battery 12 is less than the predetermined value, the switching region 62 and the output display region 64 are switched to the warning display state by the driver 54. The state of charge of the battery 12 is equal to a battery level of the battery 12.

In the warning display state, the switching region 62 and the output display region 64 are shown in the same color. In the warning display state, the switching region 62 and the output display region 64 are shown in a fifth color. The fifth color is, for example, red. In the warning display state, at least one of the switching region 62 and the output display region 64 is intermittently shown in the color. In the present embodiment, the switching region 62 and the output display region 64 are intermittently shown in the color in the warning display state.

The display screen 52 includes a charge state display region 66. The driver 54 is configured to display the state of charge of the battery 12 (refer to FIG. 1) in the charge state display region 66. The charge state display region 66 shows the state of charge of the battery 12 in a color that differs from the first color and the second color. The charge state display region 66 shows the state of charge of the battery 12 in a color that differs from the third color. The charge state display region 66 shows the state of charge of the battery 12 in the fourth color. The charge state display region 66 has a shape imitating a battery. The charge state display region 66 is arranged in the display region of the display screen 52 at the second end in the first direction and the first end in the second direction. The charge state display region 66 is divided into a first section 66A, a second section 66B, a third section 66C, a fourth section 66D, and a fifth section 66E in the second direction. The driver 54 (refer to FIG. 1) changes the color shown in the first section 66A to the fifth section 66E in accordance with the state of charge of the battery 12.

When the state of charge of the battery 12 is included in a range of 0% or greater and less than 20%, the charge state display region 66 shows only the first section 66A in the fourth color. When the state of charge of the battery 12 is included in a range of 20% or greater and less than 40%, the charge state display region 66 shows only the first section 66A and the second section 66B in the fourth color. When the state of charge of the battery 12 is included in a range of 40% or greater and less than 60%, the charge state display region 66 shows only the first section 66A to the third section 66C in the fourth color. When the state of charge of the battery 12 is included in a range of 60% or greater and less than 80%, the charge state display region 66 shows only the first section 66A to the fourth section 66D in the fourth color. When the state of charge of the battery 12 is included in a range of 80% or greater and 100% or less, the charge state display region 66 shows all of the first section 66A to the fifth section 66E in the fourth color.

The display screen 52 includes a vehicle speed display region 68. The driver 54 is configured to display the vehicle speed of the bicycle in the vehicle speed display region 68. The vehicle speed display region 68 is arranged in a central portion of the display region of the display screen 52. The vehicle speed display region 68 shows the vehicle speed, for example, in the fourth color based on the detection result of the vehicle speed sensor 36.

The display screen 52 includes a gear position display region 70. The driver 54 is configured to display the gear position of the bicycle in the gear position display region 70. The gear position display region 70 is arranged in the display screen 52 toward the second end in the second direction and toward the second end in the first direction relative to the vehicle speed display region 68. The gear position display region 70 shows the gear of the transmission 18, for example, in the fourth color based on the detection result of the gear position sensor 40.

Figure 3:
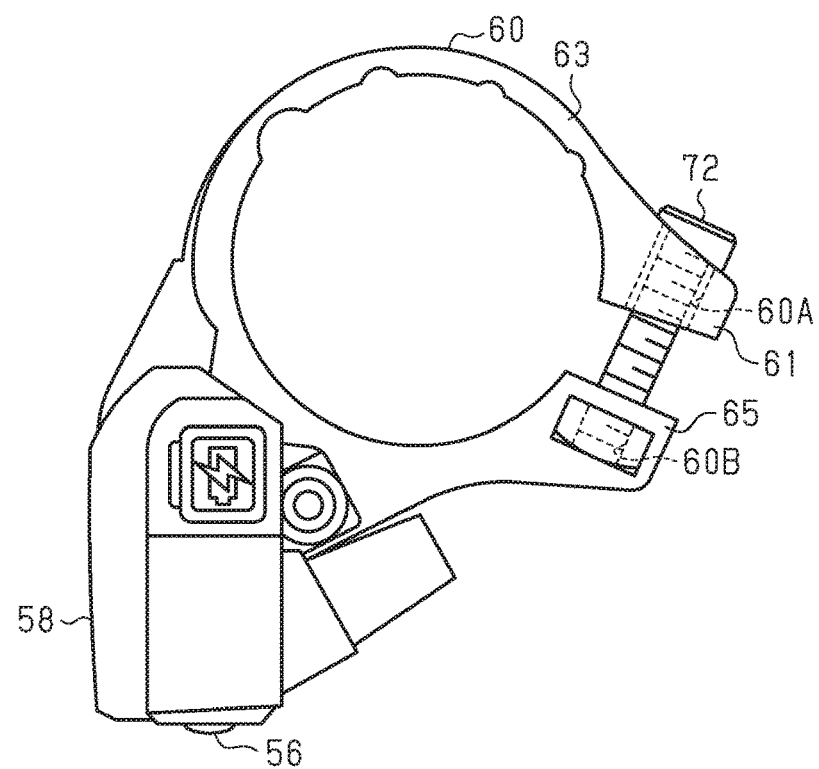
FIG. 3 is a side view showing the bicycle display illustrated in FIG. 2.

As shown in FIG. 3, the coupling portion 60 is annular and configured to receive the handlebar of the bicycle. The coupling portion 60 includes a circumferential first end 61, a circumferential second end 65, and a body 63, which is formed integrally with the first end 61 and the second end 65. The first end 61 and the second end 65 are opposed to each other. The body 63 is elastic. The coupling portion 60 is formed from a synthetic resin. The first end 61 includes a hole 60A into which an external thread 72 is inserted. The second end 65 includes an internal thread 60B or an internally-threaded nut that engages the external thread 72. The diameter of the body 63 is reduced by fastening the external thread 72 to the internal thread 60B, and the bicycle display 50 is fixed to the handlebar. The body 63 includes a housing in which the display screen 52 is located. The housing can be formed integrally with the body 63.

The operation of the bicycle display 50 will now be described with reference to FIGS. 1 and 4 to 8. In FIGS. 4 to 8, dotted portions of the display screen 52 indicate regions that are not colored. White portions of the display screen 52 indicate regions that are colored.

In a case that the user performs the activation operation on the power switch 56, the bicycle display 50 and the drive unit 20 are activated. This enables the switching region 62 of the display screen 52 to be switched to the first display state, the second display state, the third display state, the fourth display state, the fifth display state, or the warning display state. The charge state display region 66, the vehicle speed display region 68, and the gear position display region 70 show the corresponding information in the fourth color.

In a case that the user selects the first operation mode as the operation mode of the drive unit 20, the switching region 62 is switched to the first display state.

Figure 4:
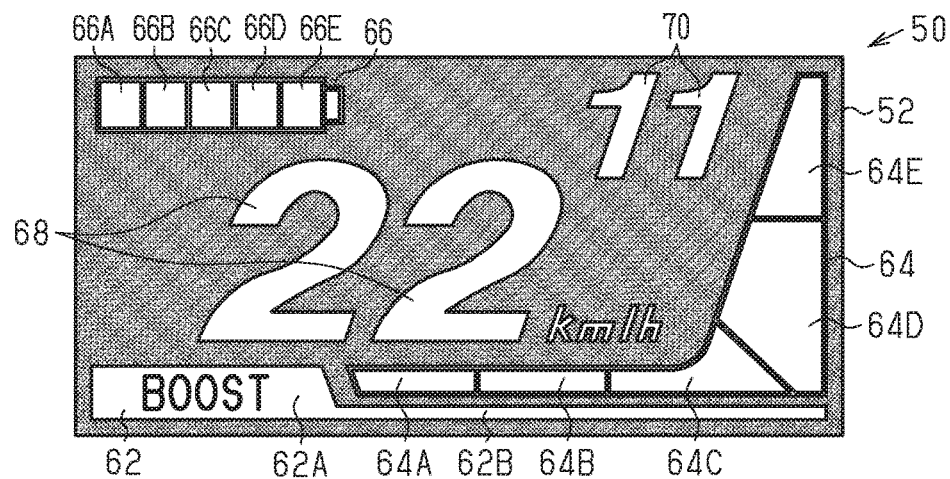
FIG. 4 is a front view of a display screen when a switching region of the bicycle display illustrated in FIG. 2 is in a first display state.

As shown in FIG. 4, in the first display state, the switching region 62 displays "BOOST," which are characters corresponding to the first operation mode, in the first portion 62A, and the first portion 62A and the second portion 62B are shown in the first color. The output display region 64 shows the output state of the motor 28 in the first color. FIG. 4 shows an example of a case in which the output of the motor 28 in the first operation mode is included in the range of 80% or greater and 100% or less of the maximum output set for the first operation mode. The output display region 64 shows the first section 64A to the fifth section 64E in the first color.

If the user operates the second operation part 32B of the operation mode operation unit 32 in a state where the first operation mode is selected by the user as the operation mode of the drive unit 20, the operation mode of the drive unit 20 is switched from the first operation mode to the second operation mode. This switches the switching region 62 from the first display state to the second display state.

Figure 5:
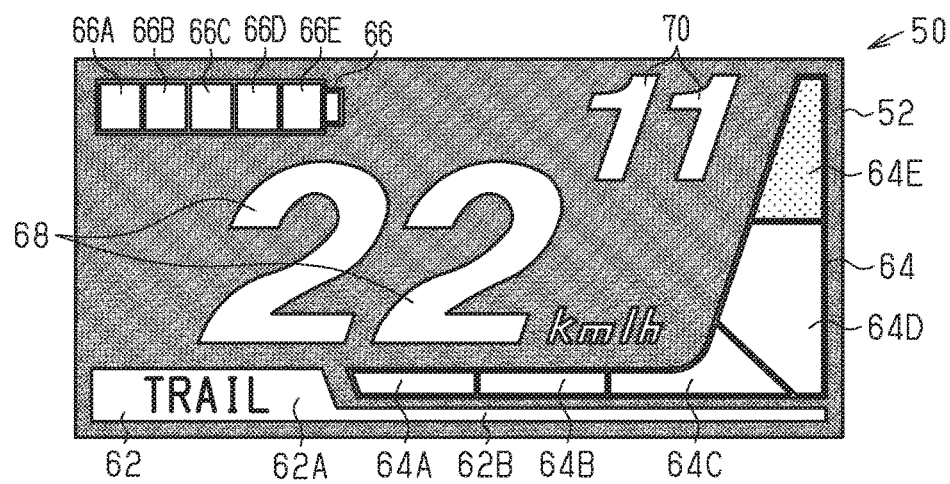
FIG. 5 is a front view of the display screen when the switching region of the bicycle display illustrated in FIG. 2 is in a second display state.

As shown in FIG. 5, in the second display state, the switching region 62 displays "TRAIL," which are characters corresponding to the second operation mode, in the first portion 62A, and the first portion 62A and the second portion 62B are shown in the second color. The output display region 64 shows the output state of the motor 28 in the second color. FIG. 5 shows an example of a case in which the output of the motor 28 in the second operation mode is included in the range of 60% or greater and less than 80% of the maximum output set for the second operation mode. The output display region 64 shows the first section 64A to the fourth section 64D in the second color.

If the user operates the second operation part 32B of the operation mode operation unit 32 in a state where the second operation mode is selected by the user as the operation mode of the drive unit 20, then the operation mode of the drive unit 20 is switched from the second operation mode to the third operation mode. This switches the switching region 62 from the second display state to the third display state.

Figure 6:
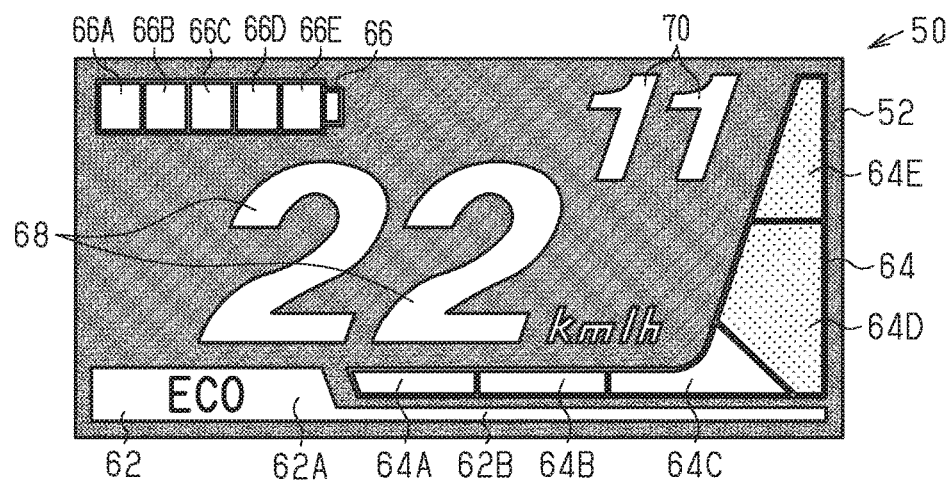
FIG. 6 is a front view of the display screen when the switching region of the bicycle display illustrated in FIG. 2 is in a third display state.

As shown in FIG. 6, in third display state, the switching region 62 displays "ECO," which are characters corresponding to the third operation mode, in the first portion 62A, and the first portion 62A and the second portion 62B are shown in the third color. The output display region 64 shows the output state of the motor 28 in the second color. FIG. 6 shows an example of a case in which the output of the motor 28 in the third operation mode is included in the range of 40% or greater and less than 60% of the maximum output set for the third operation mode. The output display region 64 shows the first section 64A to the third section 64C in the third color.

If the user operates the second operation part 32B of the operation mode operation unit 32 in a state where the third operation mode is selected by the user as the operation mode of the drive unit 20, then the operation mode of the drive unit 20 is switched from the third operation mode to the fourth operation mode. This switches the switching region 62 from the third display state to the fourth display state.

Figure 7:
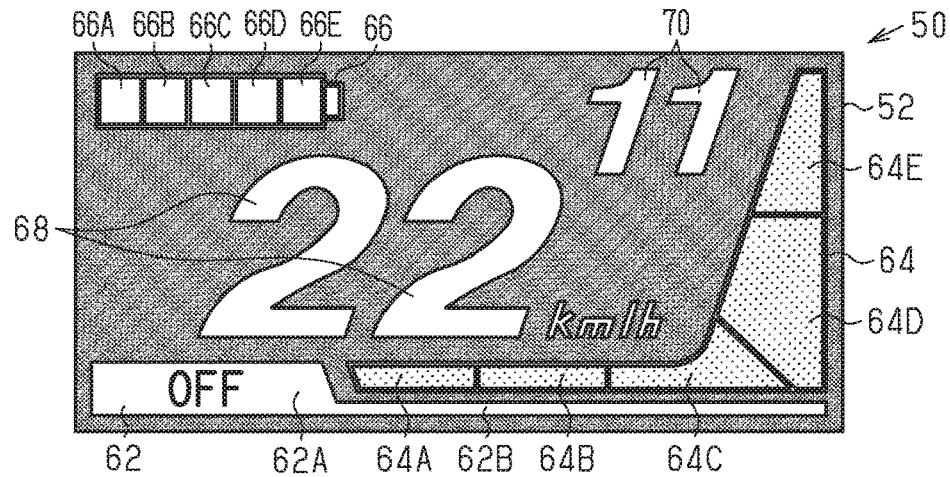
FIG. 7 is a front view of the display screen when the switching region of the bicycle display illustrated in FIG. 2 is in a fourth display state.

As shown in FIG. 7, in the fourth display state, the switching region 62 displays "OFF," which are characters corresponding to the fourth operation mode, in the first portion 62A, and the first portion 62A and the second portion 62B are shown in the fourth color. Since the motor 28 is not driven in the fourth operation mode, when the switching region 62 is in the fourth display state, the output display region 64 is not shown in a different color. The color of the output display region 64 is the same as that of the display region in a state where the bicycle display 50 is deactivated.

If the user operates the second operation part 32B of the operation mode operation unit 32 in a state where the fourth operation mode is selected by the user as the operation mode of the drive unit 20, then the operation mode of the drive unit 20 is switched from the fourth operation mode to the walk mode. In a state where the motor 28 is not driven in the walk mode, the switching region 62 is shown in the fourth color and the first portion 62A displays "WALK," which are characters corresponding to the walk mode. The output display region 64 shows all of the first section 64A to the fifth section 64E in the fourth color.

Figure 8:
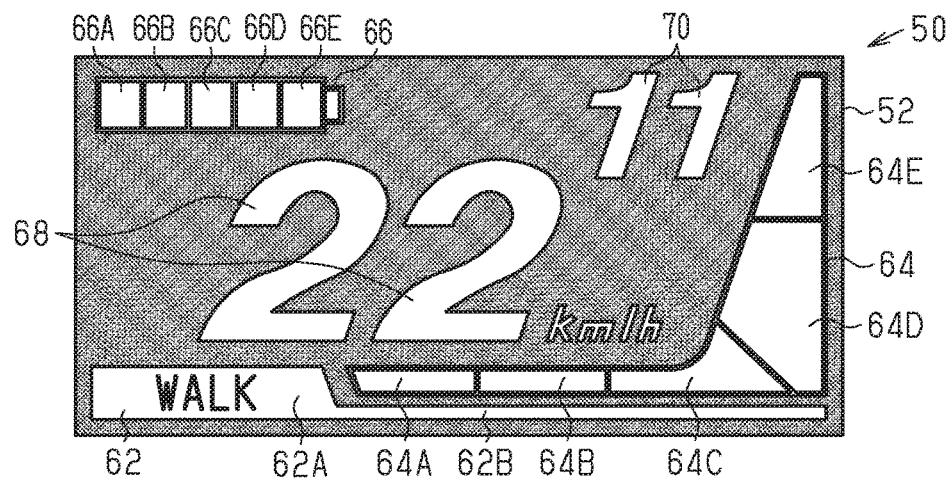
FIG. 8 is a front view of the display screen when the switching region of the bicycle display illustrated in FIG. 2 is in a fifth display state.

In a case that the user operates the second operation part 32B in the walk mode, the motor 28 is driven. As shown in FIG. 8, in the fifth display state, the switching region 62 displays "WALK," which are characters corresponding to the walk mode, in the first portion 62A. The characters are intermittently shown in the first portion 62A. The output display region 64 shows all of the first section 64A to the fifth section 64E in the fourth color. If the user stops the operation of the second operation part 32B in a state where the walk mode is selected, the first portion 62A stops the intermittent display of the characters.

If the user operates the first operation part 32A of the operation mode operation unit 32 in a state where the walk mode is selected by the user as the operation mode of the drive unit 20, then the operation mode of the drive unit 20 is switched from the walk mode to the fourth operation mode.

Figure 9:
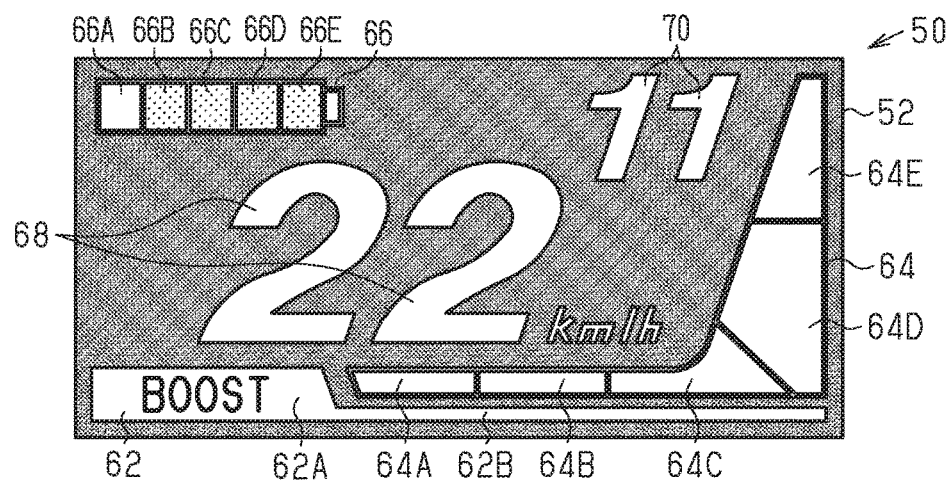
FIG. 9 is a front view of the display screen when the switching region of the bicycle display illustrated in FIG. 2 is in a warning display state.

As shown in FIG. 9, when the state of charge of the battery 12 is included in the range of 0% or greater and less than 20%, it is determined that the state of charge of the battery 12 is less than the predetermined value. Thus, the switching region 62 is switched to the warning display state from the first display state, the second display state, the third display state, the fourth display state, or the fifth display state. In the warning display state, the switching region 62 and the output display region 64 are shown in the fifth color.

Modified Examples

Specific embodiments of the bicycle display of the present invention are not limited to the above embodiment. The bicycle display can be embodied in various modes that differ from the above embodiment. The above embodiment can be modified as follows. Modified examples are examples of various modes of the bicycle display.

The electronic control unit 34 can automatically switch among the first operation mode to the fourth operation mode based on the detection result of at least one of the vehicle speed sensor 36 and the torque sensor 38.

A modified example of the bicycle display 50 includes the display screen 52 that shows information corresponding to the first operation mode and the second operation mode of a suspension device, which is one example of a bicycle component. In this modified example, the first operation mode is an operation mode in which the suspension device is locked. The second operation mode is an operation mode in which the suspension device is unlocked.

A modified example of the bicycle display 50 includes the display screen 52 that shows information corresponding to the first operation mode and the second operation mode of the transmission, which is one example of a bicycle component. In this modified example, the first operation mode is, for example, a manual gear change mode that manually changes the transmission. The second operation mode is, for example, an automatic gear change mode that automatically changes the transmission based on the detection result of at least one of the vehicle speed sensor 36 and the torque sensor 38.

In a modified example, for example, the switching region 62 can be omitted from the bicycle display 50.

A modified example of the bicycle display 50 includes the display screen 52 that shows the graphic corresponding to one of the operation mode and the operation state of a bicycle component in the color corresponding to the other one of the operation mode and the operation state of the bicycle component. The operation state of the bicycle component includes an operation state of the suspension device, the gear position of an automatic transmission, the gear position of a manual transmission, and an operation state of an adjustable seatpost in addition to the output state of the motor 28 of the drive unit 20. The operation state of the suspension device includes, for example, the height, the hardness, and the damping amount of the suspension device. The operation state of the adjustable seatpost includes, for example, the height of the seatpost. The operation mode of the bicycle component includes, for example, an operation mode of the transmission and an operation mode of the suspension device in addition to the operation mode of the drive unit 20.

A modified example of the bicycle display 50 includes the display screen 52 that shows the graphic corresponding to one of the operation mode and the operation state of a first bicycle component in the color corresponding to one of the operation mode and the operation state of a second bicycle component, which differs from the first bicycle component. The first bicycle component is, for example, one of the drive unit 20, the suspension device, the adjustable seatpost, and the transmission 18. The second bicycle component is, for example, one of the drive unit 20, the suspension device, the adjustable seatpost, and the transmission 18 that differs from the first bicycle component. The bicycle display 50 of this modified example is configured to display, for example, the graphic corresponding to the output state of the motor 28, which is one example of the operation state of the drive unit 20, in the color corresponding to the gear position, which is one example of the operation state of the transmission 18.

In a modified example, at least one of the output display region 64, the charge state display region 66, the vehicle speed display region 68, and the gear position display region 70 is omitted from the bicycle display 50.

A modified example of the bicycle display 50 allows the user to change the first to fifth colors or the combination of the first to fifth colors corresponding to each operation mode using an electronic device connected to the controller 16 or an operation unit. The electronic device is, for example, a personal computer or a smartphone.

A modified example of the bicycle display 50 includes the operation mode operation unit 32. In the bicycle display of this modified example, the operation mode operation unit 32 can include operation switches corresponding to the first operation mode, the second operation mode, the third operation mode, the fourth operation mode, and the walk mode.

A modified example of the bicycle display 50 includes one or more regions that are connected to the switching region 62 and able to be shown in a color corresponding to only one operation mode. In a case that the operation mode is switched, the color does not change to other colors corresponding to other operation modes.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle display comprising:
   a display screen configured to display an output state of a motor that assists in propelling of a bicycle,
   the display screen being configured to display an output state of the motor in a first color in a state where the motor is controlled in a first operation mode, and configured to display an output state of the motor in a second color which is different from the first color in a state where the motor is controlled in a second operation mode which is different from the first operation mode,
   the display screen being configured to display an output state of the motor in a third color in a state where the motor is controlled in a third operation mode which is different from the first and second operation modes, the third color being different from the first and second colors, and
   the display screen being configured to display an output state of the motor in a fourth color in a state where the motor is controlled in a fourth operation mode which is different from the first, second and third operation modes, the fourth color being different from the first, second and third colors.

2. The bicycle display according to claim 1, wherein
   a display driver is connected to the display screen to switch a display state of a switching region of the display screen between a first display state, which shows the switching region in the first color when the first operation mode is selected, and a second display state, which shows the switching region in the second color in a state where the second operation mode is selected.

3. The bicycle display according to claim 2, wherein
   the display driver is configured to switch the switching region to a third display state when the third operation mode is selected to show the switching region in the third color.

4. The bicycle display according to claim 3, wherein
   the display driver is configured to switch the switching region to a fourth display state when the fourth operation mode is selected to show the switching region in the fourth color.

5. The bicycle display according to claim 1, wherein
   the first operation mode and the second operation mode differ from each other in at least one of a ratio of driving power of the motor to human power and an upper limit value of output torque of the motor.

6. A bicycle display comprising:
   a display screen configured to display an output state of a motor that assists in propelling of a bicycle, the display screen being configured to display an output state of the motor in a first color in a state where the motor is controlled in a first operation mode, and configured to display an output state of the motor in a second color which is different from the first color in a state where the motor is controlled in a second operation mode which is different from the first operation mode; and
   a display driver connected to the display screen to switch a display state of a switching region of the display screen between a first display state, which shows the switching region in the first color when the first operation mode is selected, and a second display state, which shows the switching region in the second color in a state where the second operation mode is selected,
   the display driver being configured to display an output state of the motor in the first operation mode or the second operation mode with a graph in an output display region of the display screen.

7. The bicycle display according to claim 6, wherein
   the display driver is configured to display the output display region adjacent to the switching region.

8. The bicycle display according to claim 6, wherein
   the display driver is configured to display the graph in the first color in the output display region when the switching region is in the first display state, and display the graph in the second color in the output display region when the switching region is in the second display state.

9. The bicycle display according to claim 6, wherein
the display driver is configured to display the output display region as greater in area than the switching region.

10. The bicycle display according to claim 6, wherein
the display driver is configured to display the graph or a portion of the graph that is colored in the output display region in area that increases in size as an output of the motor increases.

11. The bicycle display according to claim 6, wherein
the display driver is configured to display the graph of the output display region as including a bar graph.

12. The bicycle display according to claim 2, wherein
the display driver is configured to display a charge state display region showing a battery level.

13. The bicycle display according to claim 12, wherein
the display driver is configured to display the state of charge of the battery in the charge state display region in a color that differs from the first color and the second color.

14. The bicycle display according to claim 13, wherein
the display driver is configured to switch at least one of the switching region and the output display region to a warning display state to be shown in a color differing from the first color and the second color when the state of charge of the battery is less than a predetermined value.

15. The bicycle display according to claim 14, wherein
the display driver is configured to display at least one of the switching region and the output display region in the warning display state intermittently in the color.

16. The bicycle display according to claim 14, wherein
the display driver is configured to display the switching region and the output display region in the warning display state in the same color.

17. The bicycle display according to claim 1, wherein
the display driver is configured to display a vehicle speed display region on the display screen to show a vehicle speed of a bicycle.

18. The bicycle display according to claim 17, further comprising
the display driver is configured to display the vehicle speed of the bicycle in the vehicle speed display region in a color that differs from the first color and the second color.

* * * * *